Patented Aug. 28, 1934

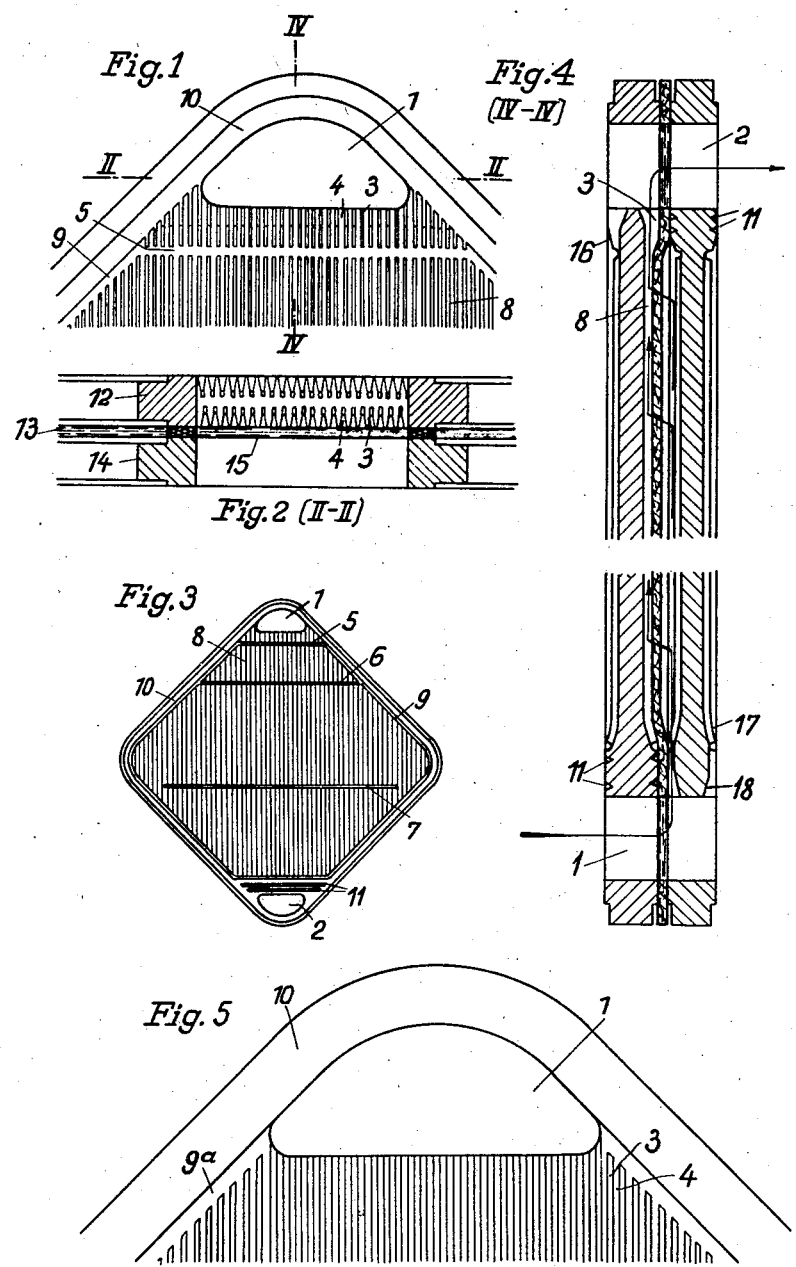

1,971,972

UNITED STATES PATENT OFFICE

1,971,972

FILTER ELEMENT

Heinrich Adam, Worms-on-the-Rhine, Germany, assignor to Enzinger-Union-Werke Aktiengesellschaft, Pfeddersheim, Germany, a corporation of Germany Application January 4, 1933, Serial No. 650,066
In Germany January 9, 1932

5 Claims. (Cl. 210—195)

The invention relates to those elements or plates for filter presses employing filtering layers of fibrous material and having distributing grooves formed by ribs extending inwardly from the inlet and outlet conduits or eyes to form a grid, and is characterized by the groove width being made so small that the ribs press the filter layer of fibrous material directly into joint making contact against the next element which is flat at this part. In particular the breadth of the groove running into the main inlet and outlet conduits must be narrow enough to ensure a good joint. Advantageously the width of the grooves is about the same or smaller than the thickness of the filter layer; or in other words their width is not greater than the thickness of the layer.

According to the invention the distributing grooves can be arranged so that only they extend to the inlet and outlet conduits, or in addition channels running round the periphery of the element outside the grid can extend into them.

Two embodiments of the invention are illustrated by way of example in the accompanying drawing.

Figures 1—4 show a filter element in which only the distributing grooves and ribs extend to the inlet and outlet conduits while Figure 5 shows an element in which in addition the channels running round the periphery of the element outside the grid extend to the inlet and outlet conduits.

Figure 1 is an elevation of part of the element with one of the main conduits,

Figure 2 is a section on the line II—II of Figure 1,

Figure 3 shows the complete element in elevation,

Figure 4 is a section on the line IV—IV of Figure 1, and

Figure 5 shows a part of a filter element with one main conduit.

To ensure a good joint it is preferable for the distributing grooves and ribs all to be parallel in the neighbourhood of the inlet and outlet conduits.

Where only the distributing grooves and ribs extend to the inlet and outlet conduits, a particularly tight joint with respect to the exterior is formed because the joint making edge surface at the most critical region is no longer broken and is thus a better support to the filter layer.

In order to enable a relatively large number of distributing grooves or ribs to extend to the inlet and outlet conduits, the section of these conduits on the side to which the grooves reach is broadened into flat form in known manner.

It has been found in the practice of the invention that it is of advantage as regards tightness of the joint and as regards providing sufficient space between adjacent grids for the swelling of the filter material, if the ribs in direct connection with the inlet and outlet conduits for a certain distance from these conduits have their upper edges at the same level as the outer joint making edges of the element while the upper edges of the remaining ribs are at a lower level.

The passage from the higher ribs to the lower can be provided either by flattening off the higher ribs over the region of change or by carrying the lower ribs to a higher level at this region.

To improve the joint it has been found advantageous to provide the joint face on the next element lying opposite the ribs extending to the inlet and outlet conduits, which face has been made flat hitherto, with packing grooves or beads running crosswise with respect to the ribs.

As the edges of filter material may very easily project into the inlet and outlet conduits and thus decrease the cross section of the inlets and outlets for liquid, according to the invention the grooves between the ribs are deepened where they run out into the conduits.

To ensure proper distribution of the liquid to be filtered over the whole grid, according to the invention, particularly in the case of filter elements in which only the distributing ribs and grooves extend to the inlet and outlet conduits, those ribs which actually extend to the conduits are interrupted at a certain distance from the conduits by cross grooves which lead the liquid to the grooves not in direct connection with the conduits.

One or more further cross grooves can be provided further away from the conduits.

If the channels running round the periphery of the element outside the grid do not lead directly into the inlet and outlet conduits, the peripheral channels can in that case communicate with the conduits solely by way of the cross grooves and the distributing grooves leading directly to the conduits, without the joint being affected.

Referring to the drawing, 1 and 2 are respectively the inlet and outlet conduits, 3 the ribs and 4 the grooves extending directly to the conduits 1 and 2, 5 the first and 6 and 7 the further cross grooves, 8 the ribs and grooves not extending directly to the conduits 1 and 2, 9 and 9a the channels running outside the grid along the periphery of the element, 10 the outer joint making edges of the element and 11 the packing grooves or beads coacting with the ribs on the adjacent element.

In Figure 2, 12 is the outlet grid, 13 the filter layer, 14 the inlet grid and 15 the joint making strip of the layer 13.

Figure 4 clearly shows the flattening off of the ribs 3 at 16 adjacent the cross groove 5 and the carrying up of the lower ribs 8 at 17. The deepening of the grooves is clearly shown at 18.

In Figure 5 it can be seen that in contradistinction to Figure 1 not only the ribs 3 and grooves 4, but also the peripheral channels 9 extend to the conduit 1.

The small width of the grooves in accordance with the invention can be clearly seen in the drawing.

The filter operates in known manner; as indicated in Figure 4 the liquid to be treated enters for example through the conduit 1, flows in the direction of the arrow and after filtration collects in the conduit 2. Naturally any number of elements and filter layers can be combined in a single filter.

What I claim is:

1. In a filter press plate of the kind described having inlet and outlet conduits, ribs for supporting a fibrous filter layer and forming open topped distributing grooves between them reaching to and directly communicating with one of said conduits, said ribs being so closely spaced that the width of said grooves is not substantially greater than the thickness of the filter layer whereby the said layer is pressed by the said ribs into joint making contact with the next adjacent plate.

2. In a filter press plate of the kind described having inlet and outlet conduits, ribs for supporting a fibrous filter layer and forming open topped distributing grooves between them reaching to and directly communicating with one of said conduits, said ribs being so closely spaced that the width of said grooves is not substantially greater than the thickness of the filter layer whereby the said layer is pressed by the said ribs into joint making contact with the next adjacent plate, and channels being formed around the periphery of the plate but not communicating with said conduits except by cross grooves and said distributing grooves.

3. In a filter press plate of the kind described having inlet and outlet conduits, a peripheral joint making surface, ribs for supporting a fibrous filter layer and forming open topped distributing grooves between them reaching to and directly communicating with one of said conduits, said ribs for a certain distance from said one conduit having their upper surfaces level with the said joint making surface and being so closely spaced that the width of said grooves is not substantially greater than the thickness of the filter layer whereby the said layer is pressed by the said ribs into joint making contact with the next adjacent plate, and other ribs not extending to said conduits also forming distributing grooves between them, said other ribs being at a lower level than said first mentioned ribs.

4. In a filter press plate of the kind described having inlet and outlet conduits, a peripheral joint making surface, ribs for supporting a fibrous filter layer and forming open topped distributing grooves between them reaching to and directly communicating with one of said conduits, said ribs for a certain distance from said one conduit having their upper surfaces level with the said joint making surface and being so closely spaced that the width of said grooves is not substantially greater than the thickness of the filter layer whereby the said layer is pressed by the said ribs into joint making contact with the next adjacent plate, grooves being provided in the plate transverse to the direction of said ribs located adjacent the other of said conduits between such other conduit and the drainage space of the plate but not communicating with such drainage space.

5. In a filter press plate of the kind described having inlet and outlet conduits, a peripheral joint making surface, ribs for supporting a fibrous filter layer and forming open topped distributing grooves between them reaching to and directly communicating with one of said conduits, said ribs for a certain distance from said one conduit having their upper surfaces level with the said joint making surface and being so closely spaced that the width of said grooves is not substantially greater than the thickness of the filter layer whereby the said layer is pressed by the said ribs into joint making contact with the next adjacent plate, said grooves being deepened adjacent to and where they communicate with said conduit.

HEINRICH ADAM.